(12) United States Patent
Selli et al.

(10) Patent No.: US 9,151,913 B2
(45) Date of Patent: Oct. 6, 2015

(54) FIBER OPTIC DEVICES AND METHODS OF MANUFACTURING FIBER OPTIC DEVICES

(71) Applicant: 3M INNOVATIVE PROPERTIES COMPANY, St. Paul, MN (US)

(72) Inventors: Raman K. Selli, Austin, TX (US); Brian M. Cole, Austin, TX (US); Donald G. Doss, Round Rock, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/603,957

(22) Filed: Jan. 23, 2015

(65) Prior Publication Data

US 2015/0131948 A1 May 14, 2015

Related U.S. Application Data

(63) Continuation of application No. 13/504,694, filed as application No. PCT/US2010/054836 on Oct. 29, 2010, now Pat. No. 8,989,539.

(60) Provisional application No. 61/257,698, filed on Nov. 3, 2009.

(51) Int. Cl.
*G02B 6/32* (2006.01)
*G02B 6/42* (2006.01)
*G02B 6/36* (2006.01)

(52) U.S. Cl.
CPC ............ *G02B 6/4206* (2013.01); *G02B 6/4214* (2013.01); *G02B 6/32* (2013.01); *G02B 6/3636* (2013.01); *G02B 6/4249* (2013.01)

(58) Field of Classification Search
None
See application file for complete search history.

(56) References Cited

U.S. PATENT DOCUMENTS

| | | | |
|---|---|---|---|
| 6,250,820 B1 | 6/2001 | Melchior | |
| 6,435,734 B2 * | 8/2002 | Okada et al. | 385/88 |
| 7,476,906 B2 | 1/2009 | Fürst | |
| 7,587,108 B2 | 9/2009 | Carpenter | |
| 7,590,315 B2 * | 9/2009 | Okubo et al. | 385/14 |
| 7,907,802 B2 * | 3/2011 | Sano et al. | 385/14 |
| 7,949,211 B1 | 5/2011 | Grzybowski | |
| 8,200,056 B2 | 6/2012 | Baugh | |
| 8,376,633 B2 | 2/2013 | Nishimura | |
| 8,755,655 B2 | 6/2014 | Krishnamoorthy | |

(Continued)

FOREIGN PATENT DOCUMENTS

| | | |
|---|---|---|
| JP | 02-015203 | 1/1990 |
| JP | 2000-292658 | 10/2000 |

(Continued)

OTHER PUBLICATIONS

PCT International Search Report from PCT/US2010/054836 mailed Jul. 28, 2011, 3 pages.

*Primary Examiner* — Akm Enayet Ullah
(74) *Attorney, Agent, or Firm* — Clifton F. Richardson

(57) ABSTRACT

A method of forming a fiber optic device includes securing one or more optical fibers to a support. The support is coupled to a base that includes one or more optoelectronic devices. After one or more of the fibers are secured to the support, and the support is secured to the base, one or more of the fibers are cleaved. A portion of the one or more optical fibers that is in contact with the support may be bent. This method, and fiber optic devices made using this method are more easily aligned and may be produced at lower costs than existing manufacturing processes.

20 Claims, 9 Drawing Sheets

(56) References Cited

U.S. PATENT DOCUMENTS

2005/0036740 A1* 2/2005 Itabashi et al. .................. 385/50
2005/0047716 A1* 3/2005 Arakida et al. .................. 385/31
2005/0220437 A1 10/2005 Kim
2006/0291782 A1* 12/2006 Carpenter et al. .............. 385/49

FOREIGN PATENT DOCUMENTS

| JP | 2001-324649 | 11/2001 |
| JP | 2005-265885 | 9/2005 |
| JP | 2008-009098 | 1/2008 |

* cited by examiner

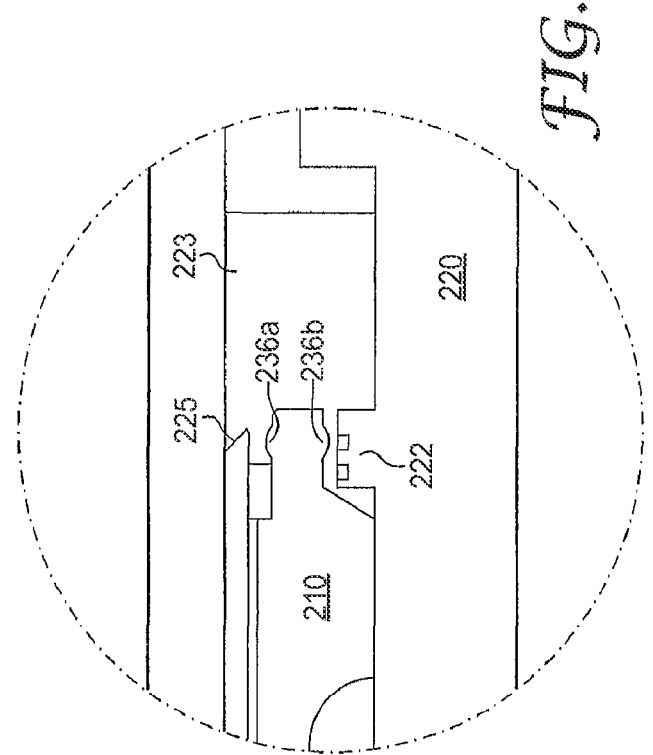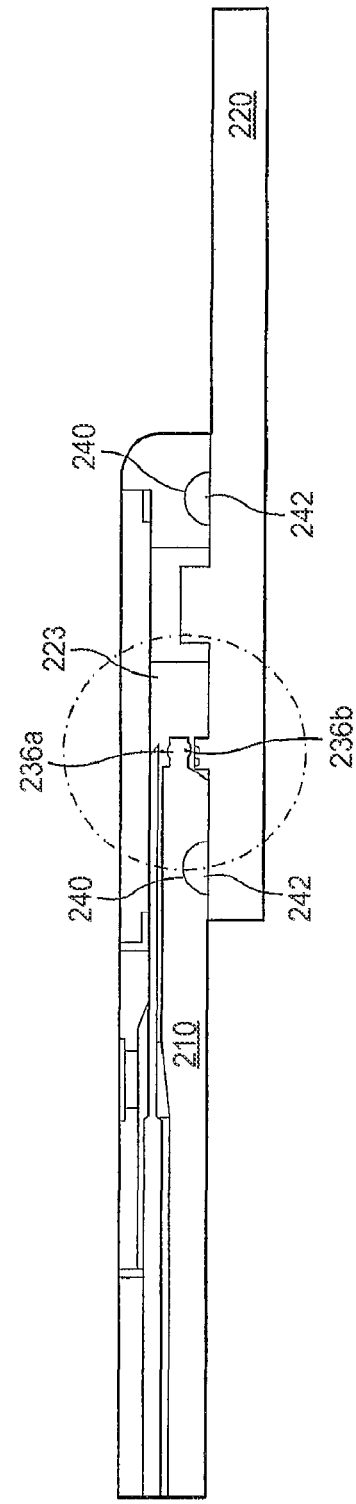

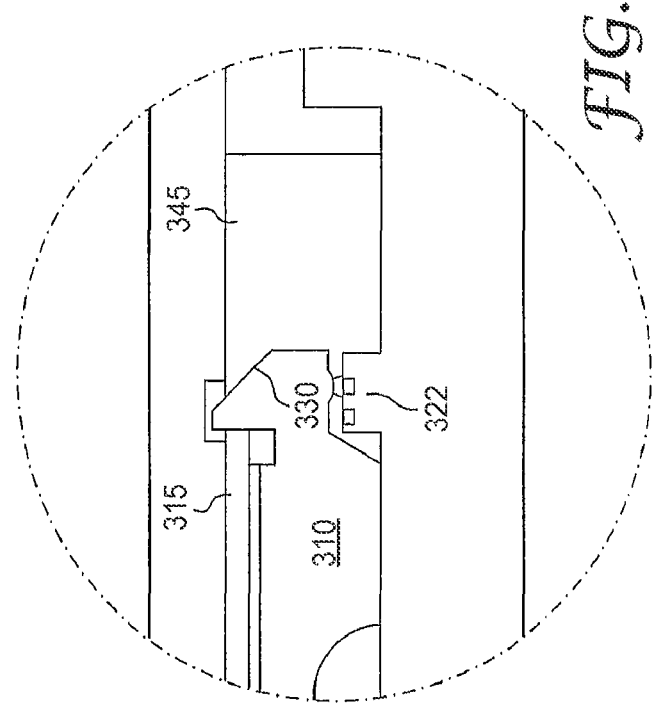
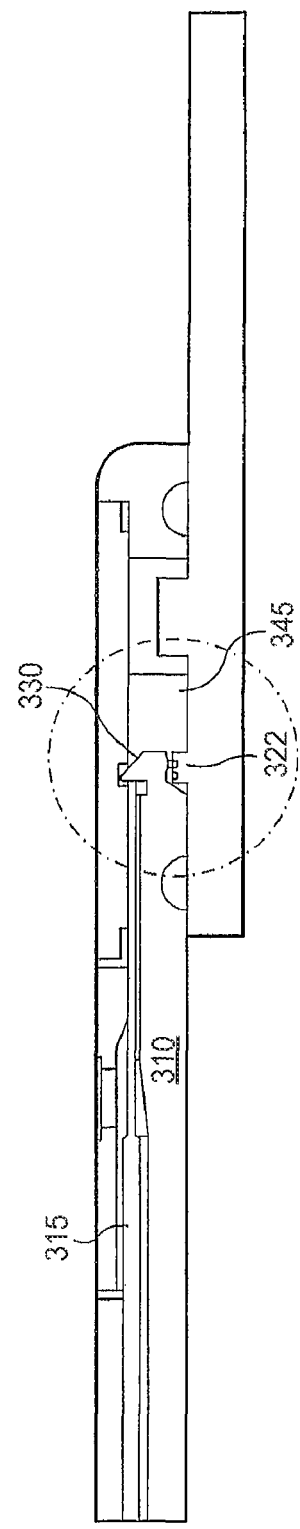

FIBER OPTIC DEVICES AND METHODS OF MANUFACTURING FIBER OPTIC DEVICES

BACKGROUND OF THE INVENTION

1. Field of the Invention

The invention generally relates to fiber optic devices. More particularly the invention generally relates to optical transceiver components.

2. Description of the Relevant Art

An optical transceiver includes electrical-to-optical signal converters such as lasers, light-emitting diodes and photodiodes. Typically, the components of the optical transceiver are packaged with electronic semiconductor components known as Pre and Post amps and Laser Drivers. The laser driver, pre-amp and post-amp transform the electrical signals further into the necessary shape and size required by other electrical circuitry found in a system. FIG. 1 depicts a block diagram of a simplified form of this arrangement and how each component is coupled to each other.

FIG. 1 shows a single light source coupling light into an optical fiber and a single fiber coupling light onto a photodetector (the exact light coupling means is not shown in this figure). This arrangement is commonly found in duplex transceiver modules used in a variety of commercial applications.

More dense transceiver modules, known as parallel optical transceivers, are now becoming available. These typically use an array of optical fibers to couple light in and out of an array of light sources and detectors. In general, light sources tend to be packaged separately from detectors to avoid interference caused by either electrical or optical cross-talk, however, a new very low cost transceiver module, being proposed for the next generation of high-speed USB connector technology, houses both the receiver and light source in a low profile package e.g., <2 mm in height.

The combination of a plurality of optical fibers in a small package create additional manufacturing problems. As the size of the optical fibers and the optoelectronic devices is reduced, manufacturing costs and time increase due to the difficulty of precisely aligning multiple components. In order to make such devices economically feasible, it is desirable to design fiber optic devices which have fewer adjustable tolerances to improve the speed and cost of manufacturing.

SUMMARY OF THE INVENTION

A method of forming a fiber optic device includes securing one or more optical fibers to a support, wherein the support comprises one or more support alignment reference features for aligning the support with a base comprising one or more optoelectronic devices. After one or more of the fibers are secured, the fibers are cleaved. The support is coupled to the base such that the one or more support alignment reference features are aligned with one or more base alignment reference features. The angle of the end of one or more of the optical fibers is greater than or equal to the critical angle formed between an optoelectronic device that is optically coupled to the optical fiber when the support is coupled to the base. In some embodiments, cleavage of the optical fiber is accomplished with a laser.

A fiber optic device, in one embodiment, includes a support and a base. The support includes one or more optical fibers coupled to the support and one or more lenses molded as a portion of the support. One or more of the optical fibers are positioned in optical alignment with one or more of the lenses. The base includes one or more optoelectronic devices. The support is coupled to the base such that one or more of the optoelectronic devices are optically coupled to one or more of the optical fibers through one or more of the lenses molded as a portion of the support.

A fiber optic device, in one embodiment, includes a support and a base. The support includes one or more optical fibers coupled to the support. At least a portion of the optical fiber in contact with the support is substantially bent. The base includes one or more optoelectronic devices. The support is coupled to the base such that one or more of the optoelectronic devices are optically coupled to the bent portion of one or more of the optical fibers.

A fiber optic device, in one embodiment, includes a support and a base. The support includes one or more optical fibers coupled to the support, wherein an end of one or more of the optical fibers is at an angle of greater than 45 degrees. The base includes one or more optoelectronic devices. The support is coupled to the base such that one or more of the optoelectronic devices are optically coupled to one or more of the optical fibers.

A fiber optic device, in one embodiment, includes a support and a base. The support includes one or more optical fibers coupled to the fiber optic support in a substantially fixed position. One or more reflecting surfaces are positioned proximate to an end of one or more of the optical fibers. The reflecting surfaces are molded as a portion of the support. The base includes one or more optoelectronic devices. The support is coupled to the base such that one or more of the optoelectronic devices are optically coupled to one or more of the optical fibers through the one or more reflecting surfaces.

A method of making a fiber optic device includes positioning one or more optical fibers on a support. The support is positioned on a base that includes one or more optoelectronic devices. The support is positioned on the base such that one or more of the optical fibers are optically aligned with one or more optoelectronic devices coupled to the base. While the support is positioned on the base, one or more of the optical fibers is cleaved at a first position.

One or more of the optoelectronic devices are activated and the efficiency of an optical connection between one or more of the optical fibers and one or more of the optoelectronic devices optically aligned with the one or more optical fibers is determined. If the efficiency of the optical connection is less than a predetermined set point, the optical fibers are cleaved at a second position.

A method of forming a fiber optic device includes securing one or more optical fibers to a support. At least a portion of the one or more optical fibers in contact with the fiber optic support is substantially bent. The support is coupled to a base that includes one or more optoelectronic devices. The support is coupled to the base such that one or more ends of the one or more optical fibers are positioned, at an angle substantially greater than zero, within 100 μm of one or more of the optoelectronic devices. While the support is positioned on the base one or more of the ends of the one or more optical fibers positioned proximate to the one or more optoelectronic devices is cleaved at an angle greater than or equal to the critical angle formed between the optoelectronic device and the end of the optical fiber positioned proximate to the optoelectronic device.

BRIEF DESCRIPTION OF THE DRAWINGS

Advantages of the present invention will become apparent to those skilled in the art with the benefit of the following detailed description of embodiments and upon reference to the accompanying drawings in which:

FIG. 7A depicts a cross-sectional view of the assembled fiber optic device of FIG. 6;

FIG. 7B depicts an expanded cross-sectional view of the assembled fiber optic device of FIG. 6;

FIG. 9A depicts a cross-sectional view of an alternate fiber optic device;

FIG. 9B depicts an expanded cross-sectional view of the alternate fiber optic device of FIG. 7A;

Figure 1:
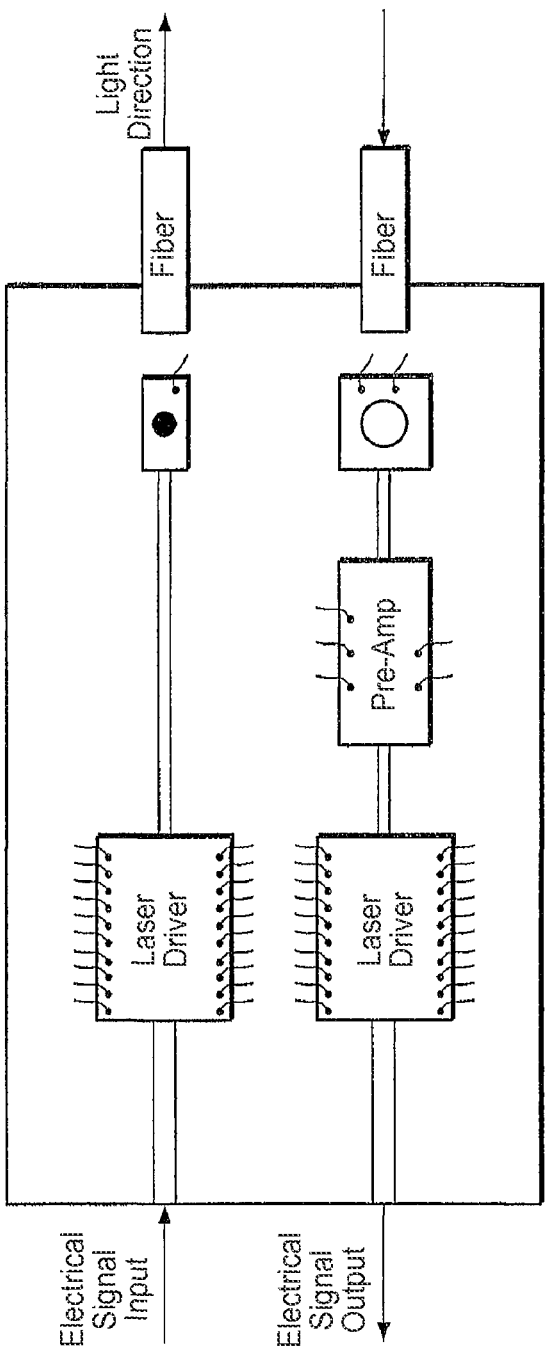
FIG. 1 depicts a schematic drawing of a duplex transceiver module.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

Described herein are fiber optic devices and methods of making fiber optic devices. In some embodiments described herein, fiber optic devices are formed from a support coupled to a base. The support is configured to support and position one or more optical fibers. In some embodiments, the support is further configured to allow cleavage of the optical fibers after the fibers are secured to the support. The support, in some embodiments, includes integrated optical components and integrated optical fiber supports. The design of the support is such that the optical fibers and integrated optical components are optically aligned when the optical fibers are positioned on the optical fiber support. The support is coupled to a mating portion of a base, the base including one or more optoelectronic devices. The mating portion of the base is configured to substantially align the optical fibers and optional optical components, with one or more of the optoelectronic devices. Fiber optic devices that include such features are more readily constructed and have less alignment requirements. Such benefits lead to quicker and more accurate construction time with respect to other fiber optic devices, leading to reduced manufacturing costs.

Certain embodiments of the inventions are described herein in more detail. Terms used herein are defined as follows.

"Optical fiber" is a glass or polymeric fiber that carries light along its length. Many examples of optical fibers are known. Glass optical fibers may be formed from silica, doped silica or other inorganic materials. Polymeric fibers may be formed from optically transparent polymers. Examples of polymers that may be used include, but are not limited to, acrylate polymers and perfluorinated polymers.

"Coated optical fiber" is an optical fiber that includes one or more coatings applied to the outside of the fiber. Coated optical fibers may include a dual coating. An inner primary coating acts as a shock absorber to minimize attenuation caused by microbending. An outer secondary coating protects the primary coating against mechanical damage and acts as a barrier to lateral forces. An example of a coated optical fiber is 3M® GGP fiber optic cable available from 3M Corporation (Minneapolis, Minn.)

"Optoelectronic devices" are electrical-to-optical or optical-to-electrical transducers, or instruments that use such devices in their operation. Examples of optoelectronic devices include, but are not limited to, photodetectors (e.g., photodiodes, phototransistors, photomultipliers, and photoresistors), laser diodes (e.g., a vertical-cavity surface-emitting laser ("VCSEL"), quantum cascade lasers, and light-emitting diodes.

"Optically transparent" is used to describe a material that allows light to pass through the material with little or no loss of light.

"Optically coupled" is when two or more optical components are positioned such that light can be transmitted between the optical components.

"Optical alignment" is when two or more optical components are positioned such that light can be transmitted between the optical components and the optical efficiency of the light transmitted is greater than 50%.

"Optical efficiency" is defined as a percentage defined by the intensity of light that is transmitted through an optical component, or two or more optically coupled optical components, compared to the intensity of light entering the optical component, or the first of two or more optically coupled components.

"Total internal reflection" ("TIR") is an optical phenomenon that occurs when a ray of light strikes a medium boundary at an angle larger than a particular critical angle with respect to the normal to the surface. If the refractive index is lower on the other side of the boundary, no light can pass through and all of the light is reflected. The "critical angle" is the angle of incidence above which the total internal reflection occurs.

Figure 2:
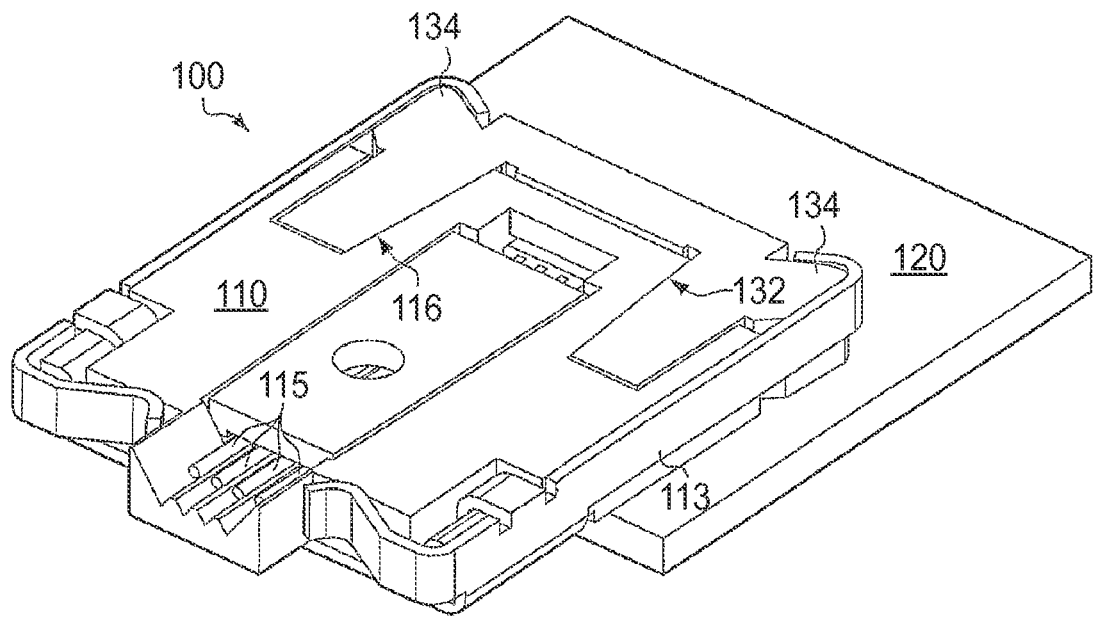
FIG. 2 depicts a perspective view of an assembled fiber optic device.

FIG. 2 depicts a perspective view of an assembled fiber optic device 100. Fiber optic device 100 includes a support 110 and a base 120. Support 110 includes one or more optical fibers 115 coupled to the support. Base 120 is a structure that includes one or more optoelectronic devices and circuitry configured to control operation of the one or more optoelectronic devices. In one embodiment, base 120 is a printed circuit board (e.g., a FR4 board).

Figure 3:
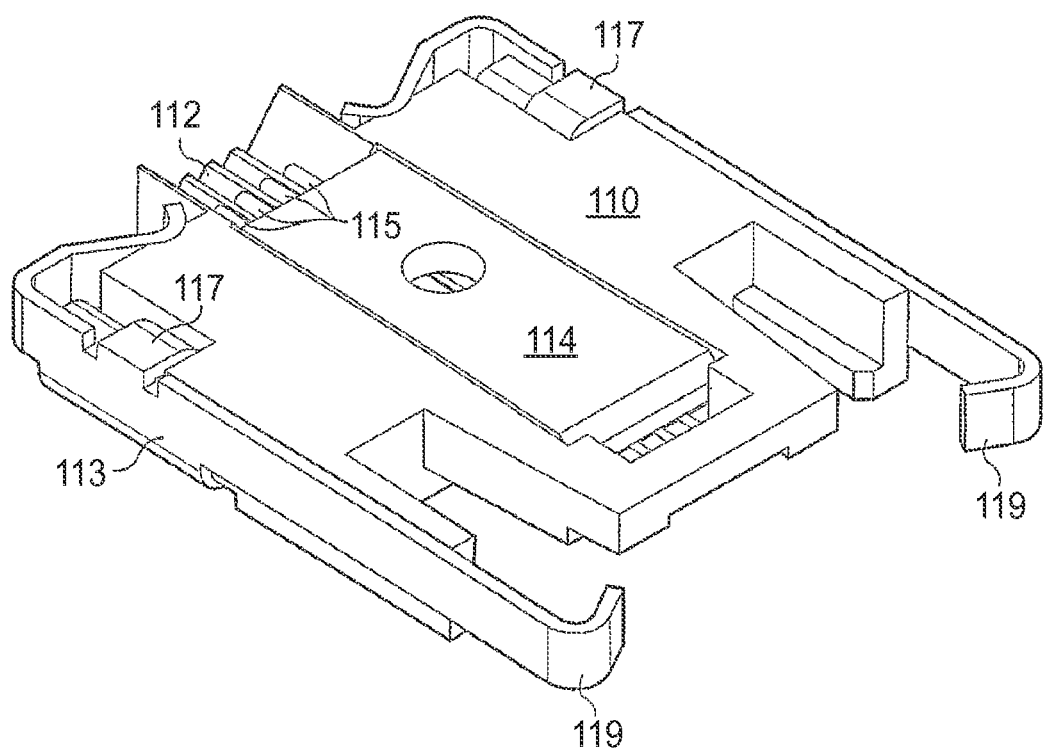
FIG. 3 depicts a perspective view of an optical fiber support.

In FIG. 3, a perspective view of support 110 is shown. In one embodiment, one or more grooves 112 are formed in the support, extending through an axial axis of the support. One or more optical fibers 115 may be positioned in grooves 112. Grooves 112 may be formed in any shape capable of receiving an optical fiber. In one embodiment, grooves 112 are substantially "V" shaped. The use of "V" shaped grooves allows simplified placement and alignment of the optical fibers in support 110.

In one embodiment, optical fibers 115 are retained on support 110 using a cap 114. Cap 114 may be a designed to be interlocked with a mating portion of support 120. For example, cap 114 may include one or more protrusions which may be interlocked with corresponding projections of the support to form a lock fit. In some embodiments, cap 114 may be used to retain optical fibers 115 in the grooves 112 while the optical fibers are bonded to the grooves using an adhesive. After optical fibers 115 are bonded to grooves 112, cap 114 may be removed. Alternatively, cap 114 may remain in place to protect optical fibers 115 from damage and the outer environment.

In one embodiment, cap 114 may be formed from an optically transparent material (e.g., an ultraviolet transparent polymer). During manufacture, optical fibers may be bonded to support 110 using a light curable adhesive (e.g., an ultraviolet curable adhesive). Cap 114 may be formed from a material that allows light capable of activating the adhesive to pass through the cap to the optical fibers disposed under the cap. In some embodiments, the adhesive used is optically transparent when cured. Examples of appropriate optically transparent adhesives include ultraviolet curable epoxy adhesives.

Referring to FIG. 2, support 110 is coupled to base 120 through a housing 130. Housing 130 may be positioned above one or more of the optoelectronic devices disposed on the base. FIGS. 5A and 5B depict housing 130 disposed over optoelectronic devices 122. Housing 130 is positioned on base 120 to environmentally protect one or more of the optoelectronic devices and or circuitry disposed on the base. In one embodiment, housing 130 has a shape that is complimentary to the shape of support 110. In a specific embodiment, as depicted in FIG. 2, housing 124 has a tapered inner surface 132. The angle of tapered inner surface 132 is complementary to the angle of a tapered outer surface 116 of support 110. During assembly, support 110 may be positioned within a cavity 134 defined by housing 130 (see FIG. 4A) such that the tapered surfaces are in contact with each other (as depicted in FIG. 2). Use of tapered surfaces allows movement of support 110 with respect to base 120 during assembly. By using tapered surfaces the position of support 110 with respect to housing 130 may be adjusted to allow better alignment of optical fibers 115 with the optoelectronic devices.

Support 110 may include a coupler 113. Coupler 113 may be attached to support 110 and be configured to interact with a complementary coupling device on housing 130 to secure the support to the housing and base 120. In an embodiment, coupler 113 is in the form of a clip attached to the outer surface of support 110 through a pair of connectors 117. Coupler 113 may include a pair of engaging sections 119. When support 110 is coupled to housing 130, engaging sections 119 are elastically pushed outward by the corresponding mating structures 137 of the housing. Engaging sections 119 of coupler 113 slide past mating structures 137 and snap into engagement with mating structures 137 to secure support 110 to housing 130. Some tolerance may be designed into coupler 113 to allow small changes in the lateral and axial position of support 110 with respect to housing 130 to allow alignment adjustments to be made.

Figure 4A:
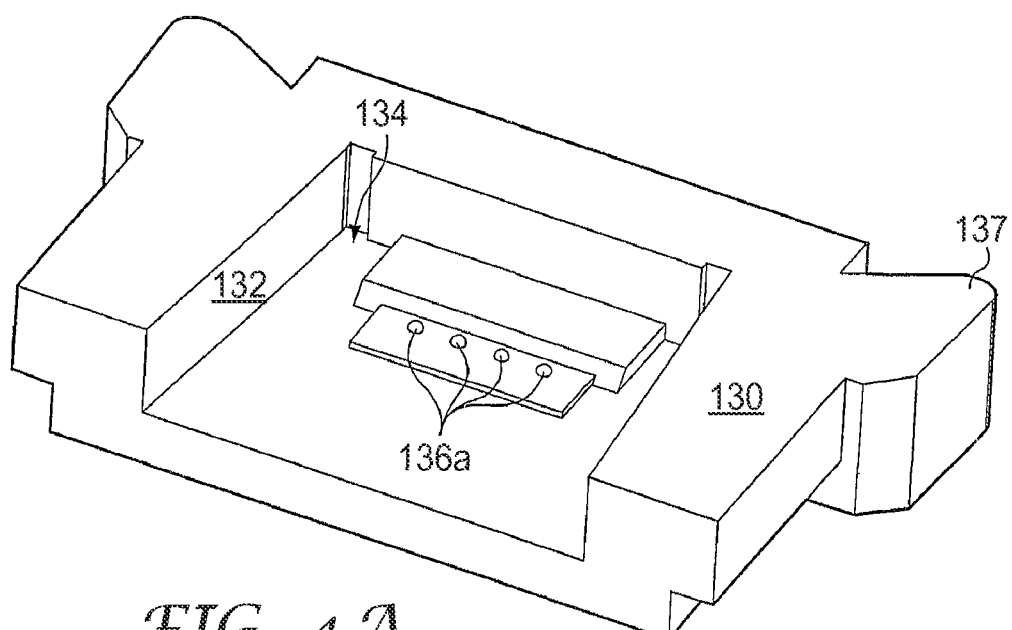
FIG. 4A depicts a perspective view of a top face of an optoelectronic housing.
Figure 4B:
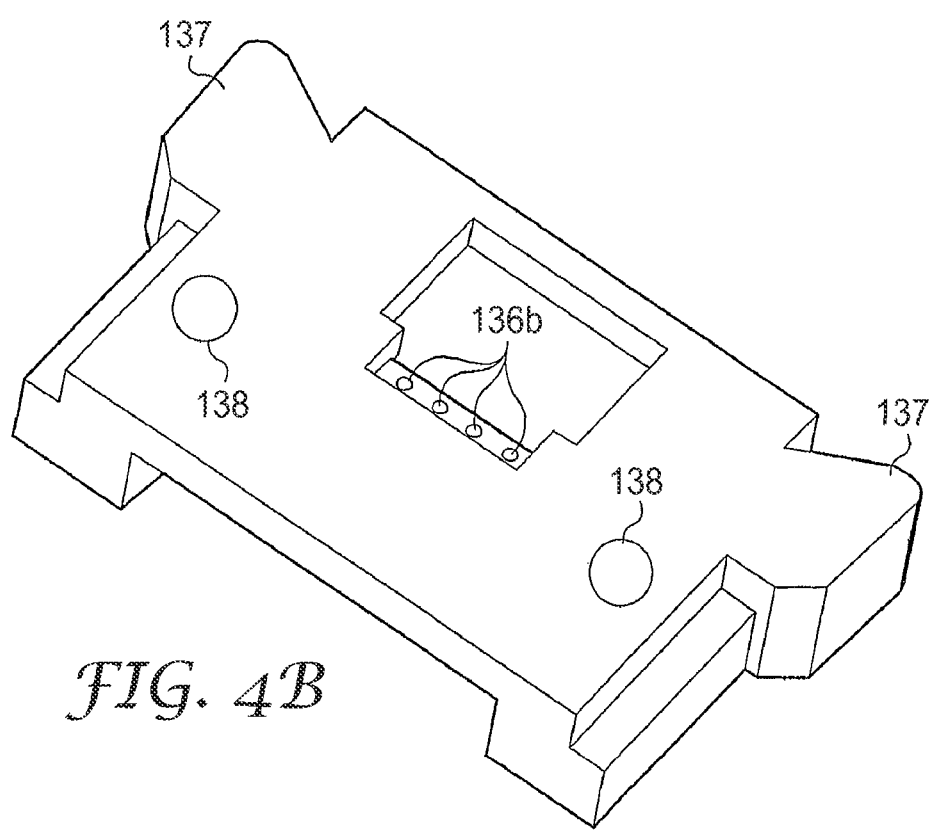
FIG. 4B depicts a perspective view of a bottom face of an optoelectronic housing.
Figure 5A:
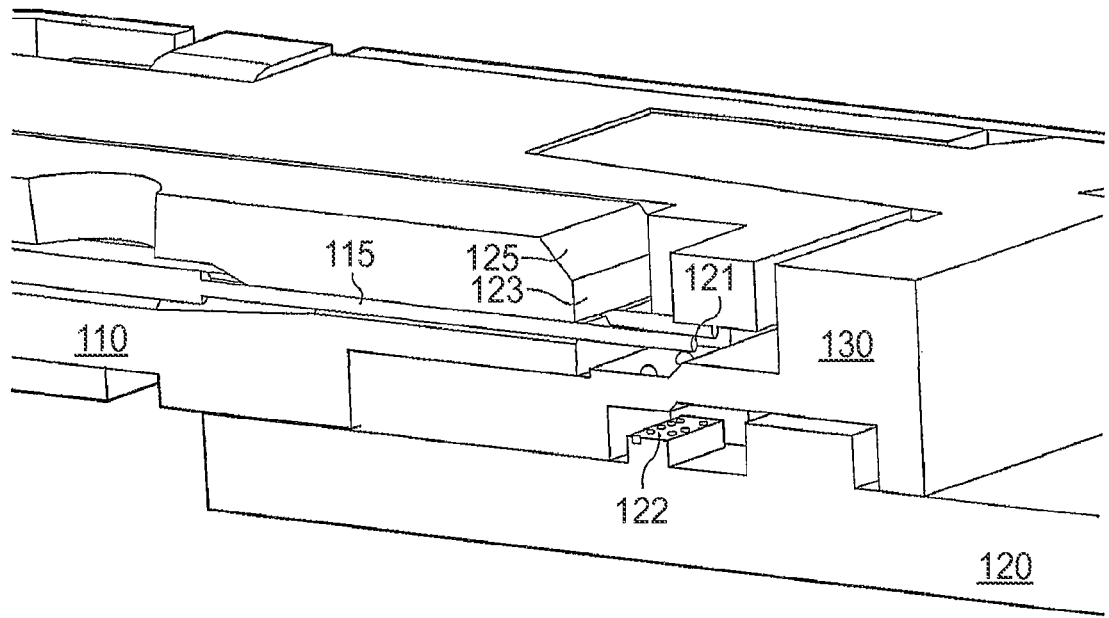
FIG. 5A depicts a cross-sectional perspective view of a fiber optic device prior to cleavage of the optical fibers.
Figure 5B:
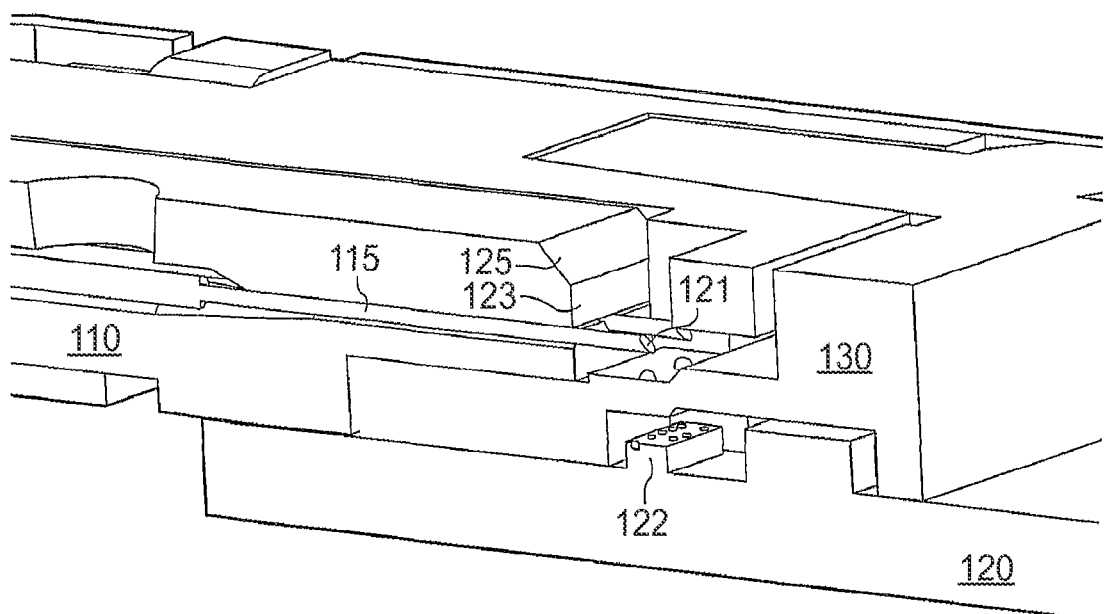
FIG. 5B depicts a cross-sectional perspective view of a fiber optic device after cleavage of the optical fibers.

FIGS. 4A and 4B depict perspective views of the top and bottom, respectively, of housing 130. Referring to FIG. 4A, the top face of housing 130 serves as an alignment feature for a corresponding structure of support 110. In one embodiment, housing 130 includes a cavity 134 which is configured to receive a portion of support 110. Cavity 134 has a tapered surface that is complimentary to tapered outer surface 116 of a portion of support 110, as depicted in FIG. 2.

One or more lenses 136a may also be formed in housing 130. In one embodiment, a first set of lenses may be formed on a top surface of the housing. In one embodiment, a single lens may be used to optically couple the optical fiber to the optoelectronic device. A single lens may be both converging and collimating. For example, a lens may be converging when light travels from the optoelectronic devices to the optical fibers. Alternatively, the same lenses may collect light from the optical fibers to transfer to the light more efficiently to the optoelectronic devices. In some embodiments, a single lens may be oriented in the appropriate direction based on the nature of the optoelectronic devices that is optically coupled to the lenses. For example, the lenses may be oriented to focus light from the optical fiber onto the optoelectronic device, when optically coupling the optical fiber to a photodetector. When optically coupling a light emitting device (e.g., a light emitting diode such as a laser diode) to the optical fiber, the lens may be oriented to focus light from the light emitting device onto the optical fiber. For duplex transceiver modules a mixture of photodetectors and light emitting devices are coupled to base 120 and the efficiency is enhanced by the use of appropriately oriented lenses 136a in housing 130.

When coupling light from a light emitting device to an optical fiber, collimation is only approximate as the lens is positioned such that the source light is imaged slightly inside the optical fiber. Imaging the source light in this manner causes back reflection to diverge back to the laser. When using a light emitting device in combination with focusing the image inside of a TIR fiber, back-reflection is significantly reduced as the fiber tends to diverge the reflected light since the fiber surface, facing the lens, is not flat as in a polished or cleaved flat end-face, but spherically curved.

FIG. 4B depicts a bottom face of housing 130. Housing 130 may include one or more locating holes 138 positioned on the bottom face. Locating holes 138 may mate with one or more alignment posts (not shown) affixed to the base. Locating holes 138, in combination with alignment posts, are used to provide an approximate alignment of housing 130 with the optoelectronic devices. The diameter of an alignment post may be less than a diameter of the corresponding locating hole. This allows the position of housing 130, with respect to base 120, to be moved after the housing is coupled to the base. In one embodiment, an active alignment may be performed after housing 130 is coupled to base 120. During active alignment, one or more of the optoelectronic devices are activated and the position of housing 130 is altered until a maximum optical coupling efficiency through the one or more lenses 136 is achieved. An adhesive may be used to secure housing 130 to the base 120 after the components are optically aligned.

One or more lenses 136b, in addition to, or instead of, lenses 136a depicted on the top face, may be disposed on the bottom face. In one embodiment, lenses 136b are the only lenses present and are oriented in the same manner as described above to be either converging or diverging, depending on the nature of the optoelectronic component. In other embodiments, a pair of lenses 136a and 136b are present. Each lens 136b is optically coupled to a corresponding lens 136a. The orientation of the optically coupled pair of lenses is determined, in part, by the optoelectronic component. For example, if the optoelectronic component is a photodetector, bottom face lenses 136b may be oriented to focus light on the photodetector, while top face lenses 136a may be oriented in a collimating orientation to collect light from the optical fiber and direct the light to the photodetector. If the optoelectronic component is a light emitting device (e.g., a light emitting diode such as a laser diode), bottom face lenses 136b may be oriented to collect light from the light emitting device, while top face lenses 136a may be oriented to focus light collected form the light emitting device onto the optical fiber. A system having two lenses allows the optical path to be extended through the collimating effect of the first lens that the light reaches. While a double lens configuration may be more efficient, the use of only a single lens can reduce the cost and work required to assemble an optical fiber device.

In one embodiment, housing 130 is formed from an optically transparent material. Examples of optically transparent materials that may be used to form housing 130 include, but are not limited to, optically transparent polyetherimides, polycarbonates, and polyacrylates. In an embodiment, housing 130 is formed as a single molded piece. Molding may be accomplished using injection molding techniques, or other molding techniques for forming a single unitary polymeric material. In an embodiment, lenses (136a and/or 136b) are molded as a portion of housing 130. Specifically, a mold is formed which includes one or more portions that represent the outer surface of a lens. By molding housing 130 from an optically transparent material, lenses may be formed which are a part of housing 130. Use of a molding process in this manner to create housing 130 helps improve the efficiency and accuracy of locating lenses (136a and/or 136b) in the housing. For example, in cases where two lenses are used, the lens pairs may be formed in a predetermined aligned configuration by creating the appropriate mold. Once formed, housing 130 will have lens pairs that are optically aligned with each other and will require no further alignment. This use of a molded housing having lenses formed as an integral part of the housing reduces manufacturing time and improves the efficiency of the device.

Optical coupling of an optical fiber with an optoelectronic device can be accomplished in a number of different ways. Generally, optical fibers can be coupled in either a butt-coupling arrangement, either with or without a lens, or by using total internal reflection ("TIR") to reflect light into the optical fiber. In a butt-coupling arrangement, the optoelectronic device is in lateral alignment with the optical fiber. This arrangement can be difficult to manufacture and align because the fiber and active devices need to come extremely close together which proves impractical. In some embodiments, the butt-coupling arrangement can be overcome using various forms of lenses introduced to extend the optical path. This, however, adds additional cost to the manufacturing of such devices. Additionally, the need for lateral alignment of the optical fiber and the optoelectronic device will tend to increase the profile of the device. Coupling the optical fiber to the optoelectronic device by taking advantage of the TIR effect allows devices to be formed having profiles significantly less than a typical butt-coupled arrangement.

FIGS. 5A and 5B, show a perspective cross-sectional views of the assembly of a fiber optic device configured to use TIR to optically couple an optoelectronic device to an optical fiber. Light is coupled between optoelectronic device and an optical fiber by affixing the end of an optical fiber 115 over an optoelectronic device 122. In one embodiment, an end 121 of optical fiber 115 is beveled as depicted in FIG. 5B. In one embodiment, light propagates from light emitting optoelectronic device 122 through the side of optical fiber 115 and is totally internally reflected by beveled end 121 into the core of the optical fiber. The maximum percentage of power which can be coupled using this geometry is very close to that which is achievable by butt-coupling into a cleaved fiber. Additionally, light propagating through optical fiber 115 may be totally internally reflected to an optoelectronic device by beveled end 121 of the optical fiber. In some embodiments, beveled end 121 has an angle of about 45 degrees. An advantage of a beveled fiber assembly over the butt-coupling assembly is the relative insensitivity of a TIR coupled optical fiber to variations in the geometrical parameters of the different parts of the alignment assembly such as the groove dimensions and fiber parameters.

Positioning of beveled end 121 in the proper orientation with respect to the optoelectronic device is important for achieving optical efficiency. Due to the small dimensions involved, positioning of a pre-beveled optical fiber in the precise location to maximize the optical efficiency can be difficult and time consuming. In one embodiment, beveled end 121 of an optical fiber is created after the optical fiber is positioned over the optoelectronic device. For example, an optical fiber 115 may be secured to support 110 and the support coupled to base 120 (e.g., through housing 130). Optical fiber 115 may be positioned in the support such that end 121 of the optical fiber extends beyond an interior wall 123 of support 110, as depicted in FIG. 5A. When coupled to housing 130, the optical fiber is disposed in a space formed between support 110 and housing 130. Support 110 is aligned with housing 130 by using one or more support alignment reference features and one or more housing reference features. Alignment of these features will bring optical fiber 115 into substantial alignment with one or more of the optoelectronic devices. Once support 110 is secured in a substantially aligned positioned, ends 121 of optical fibers 115 extending into the space are cleaved at an angle greater than or equal to the critical angle formed between the optoelectronic device that is optically coupled to the optical fiber. Cleaving of the fiber may be accomplished by mechanical means or by laser cleaving. The position of the cleaving is also controlled to maximize TIR coupling between optoelectronic devices 122 and optical fibers 115. As can be seen in FIGS. 5A and 5B, housing 130 and support 110 are configured such that, when assembled, an angled section 125 of support 110 creates a pathway in which a laser (or mechanical cleaving device) can pass the support and cleave the optical fiber. Additionally, the space between support 110 and housing 130 may be designed to accommodate the cleaved ends of the optical fiber until the ends can be removed. The laser (or mechanical cleaving device) may be oriented, with respect to the optical fibers, based on one or more common alignment markings of housing 130 and support 110 to ensure accurate cutting of the optical fibers. For example, an alignment feature on base 120 may be coupled to an alignment feature of a laser cleaving apparatus. Since base 120 has already been properly aligned with respect to support 110, through housing 130, the cleavage of optical fibers 115 may be accomplished with little or no fine tuning of the position of the cleaving device. This method helps to ensure that the length and angle of each fiber is accurately controlled with respect to the optical components and improves the repeatability of the process.

In another embodiment, a cleaving apparatus may be aligned with optical fibers 115 using one or more of the optoelectronic devices. Activating the optoelectronic devices may allow accurate alignment of the laser cleaving tool with optical fibers 115. For example, if base 120 includes one or more photodetectors, an aligning laser may be used to align the cleaving device with optical fibers 115 by using the one or more photodetectors to help determine the position of the cleaving device with respect to the optical fiber being cleaved. Once the proper alignment has been achieved the optical fiber may be cut to the appropriate angle, at the appropriate position. Such a process may reduce the chance of misalignment of the beveled optical fiber end with the optoelectronic device.

In another embodiment, an iterative process may be used to cleave optical fibers 115. In an iterative process, support 110, which includes one or more optical fibers 115, is coupled to housing 130. Using one or more common alignment reference features, optical fibers 115 are cleaved at a first position (and, in some embodiments, at an angle about equal to the critical angle). After cleaving optical fibers 115, one or more of the optoelectronic devices are operated and the efficiency of the coupling between one or more optoelectronic devices and one or more corresponding optical fibers is determined. If the efficiency is determined to meet a predefined set point, the process is considered to be complete. If the efficiency is less than a pre determined set point, the angle or lateral position of the cleaving device may be altered and the fiber cleaved at an angle and/or in a position that is different than the first set of cleaving conditions. This process may be repeated until the device is deemed to be acceptable, or it is determined that the device cannot be properly constructed (in which case the device may be discarded).

Most optical fibers are coated optical fibers. Coatings are typically in the form of polymeric materials that protect the fibers from damage. In one embodiment, use of a laser to cleave the fiber also offers the advantage of allowing easy removal of any coating present on the fiber. In an embodiment, a coated optical fiber is positioned on a support as discussed above. The coated portion of the optical fiber may extend from the support into the space formed when the support is coupled to the housing. Prior to cleaving the optical fiber, a laser may be used to remove all or a portion of the coating covering the optical fiber. Alternatively, the optical fiber may be cleaved by the laser and the coating may be removed by the laser after cleaving. In other embodiments, the coating may be removed after cleaving the optical fiber using mechanical or chemical (e.g., acid stripping) techniques.

Figure 6:
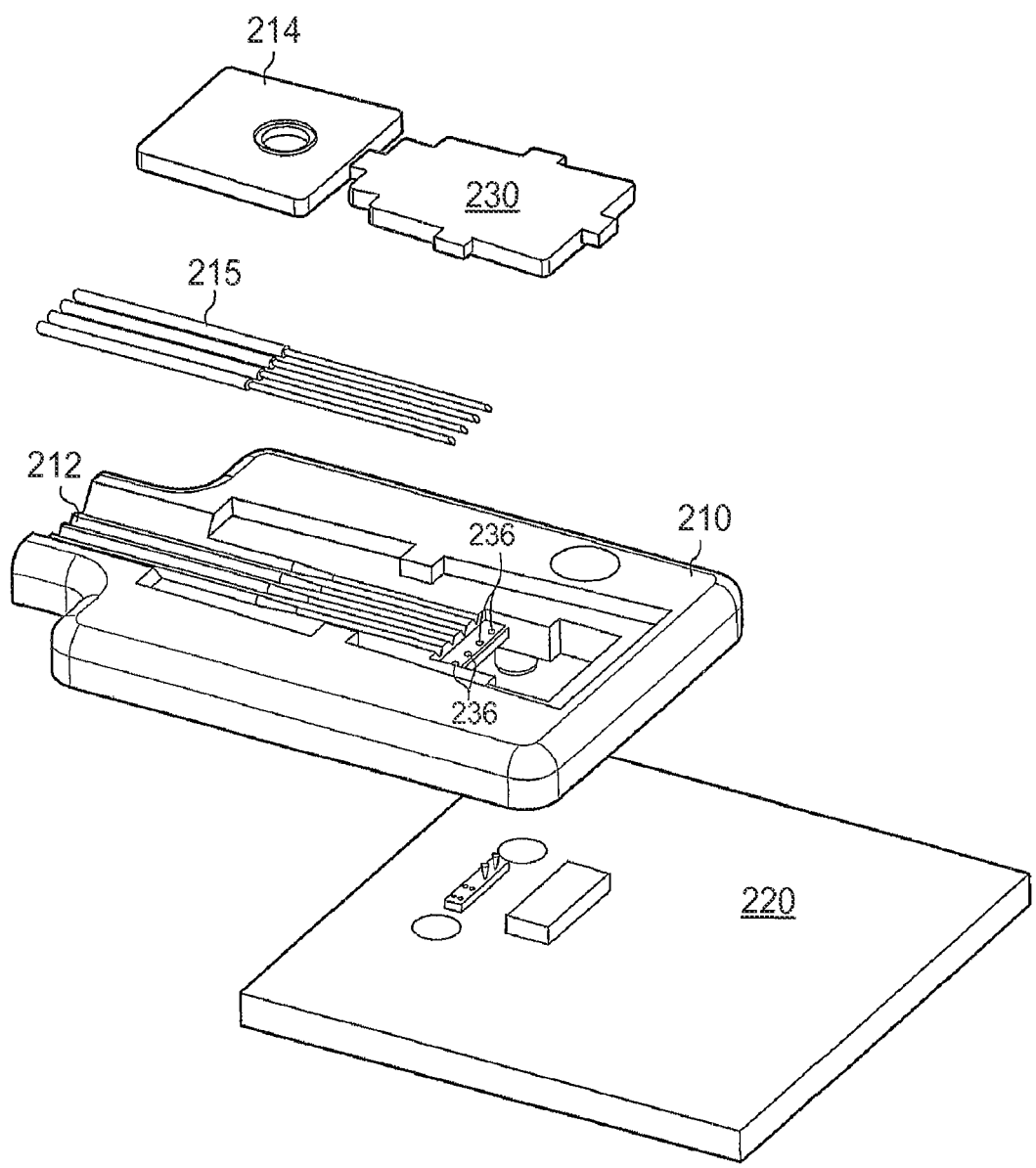
FIG. 6 depicts an exploded perspective view of an alternate embodiment of a fiber optic device.

Another embodiment of a fiber optic device is depicted in FIG. 6. This embodiment is similar to the embodiment described in FIGS. 2-5. In contrast to the previously described embodiment, the support and housing are formed as a single member. As shown in FIG. 6, a fiber optic device includes a combined support/housing 210 which is coupled to base 220. The support/housing 210 includes one or more optical fibers 215 coupled to the support/housing. Base 220 is a structure that includes one or more optoelectronic devices and circuitry configured to control operation of the one or more optoelectronic devices. In one embodiment, base 220 is a printed circuit board (e.g., a FR4 board). In one embodiment, one or more grooves 212 are formed in support/housing 210, extending through an axial axis of the support/housing. One or more of optical fibers 215 may be positioned in grooves 212. Grooves 212 may be formed in any shape capable of receiving an optical fiber. In one embodiment, grooves 212 are substantially "V" shaped. The use of "V" shaped grooves 212 allows simplified placement and alignment of optical fibers 215 in support/housing 210.

In one embodiment, optical fibers 215 are retained on support/housing 210 using a cap 214. Cap 214 may be a designed to be interlocked with a mating portion of support/housing 210. For example, cap 214 may include one or more protrusions which may be interlocked with corresponding projections of support/housing 210 to form a lock fit. In some embodiments, cap 214 may be used to retain optical fibers 215 in grooves 212 while the optical fibers are bonded to the grooves using an adhesive. After optical fibers 215 are bonded, cap 214 may be removed. Alternatively, cap 214 may remain in place to protect optical fibers 215 from damage and the outer environment. As discussed previously, cap 214 may be formed from an optically transparent material to allow curing light to be transmitted to the adhesive through cap 214.

In an embodiment, a fiber optic device may also include a housing cap 230. Since the housing (from the previously described embodiments) is now formed as part of the support, housing cap 230 may be used to environmentally protect one or more of the optoelectronic devices and or circuitry disposed on the base.

One or more lenses 236 may also be formed in support/housing 210. FIGS. 7a and 7b depict a cross-sectional view of support/housing 210 coupled to base 220. In one embodiment, one or more lenses 236 may be formed in support/housing 210. In some embodiments, lenses may be oriented to collimate and focus light based on the nature of the optoelectronic device, as previously discussed. In some embodiment, a first set of lenses 236a may be formed proximate to the optical fiber and a second set of lenses 236b may be formed proximate to the optoelectronic device.

In one embodiment, support/housing 210 is formed from an optically transparent material. In an embodiment, support/housing 210 is formed as a single molded piece. Molding may be accomplished using injection molding techniques, or other molding techniques for forming a single unitary polymeric material. In an embodiment, lenses (236a and/or 236b) are molded as a portion of support/housing 210. Specifically, a mold is formed which includes one or more portions that represent the outer surface of a lens. By molding support/housing 210 from an optically transparent material, lenses may be formed which are a part of the support/housing. Use of a molding process in this manner to create support/housing 210 helps improve the efficiency and accuracy of locating lenses (236a and/or 236b) in the housing. For example, in cases where two lenses are used, the lens pairs may be formed in a predetermined aligned configuration by creating the appropriate mold. Once formed, support/housing 210 will have lens pairs that are optically aligned with each other and will require no further alignment. This use of a molded support/housing having lenses formed as an integral part of the support/housing reduces manufacturing time, reduces cost, and improves the efficiency of the device.

In one embodiment, the beveled end of an optical fiber is created after the optical fiber is positioned in the support/housing. An optical fiber may be secured to support/housing and positioned in the support/housing such that the end of the optical fiber extends beyond an interior wall of the support over one or more of the molded lenses (similar to the embodiment depicted in FIGS. 5A and 5B). The ends of the optical fibers extending over the lenses are cleaved at an angle greater than or equal to the critical angle formed between the optoelectronic device that is optically coupled to the optical fiber. In one embodiment, cleaving of the fiber may be accomplished by laser cleaving as described previously. As can be seen in FIGS. 7A and 7B, support/housing 210 is configured such that an angled section 225 of the support/housing creates a pathway in which a laser (or mechanical cleaving device) can pass the support/housing and cleave one or more of the optical fibers. Additionally, the support/housing includes a space 223 that may be designed to accommodate the cleaved ends of the optical fiber until the ends can be removed. The laser (or mechanical cleaving device) may be oriented based on one or more alignment markings of the housing/support 210 or base 220 to ensure accurate cutting of the fiber.

Figure 8:
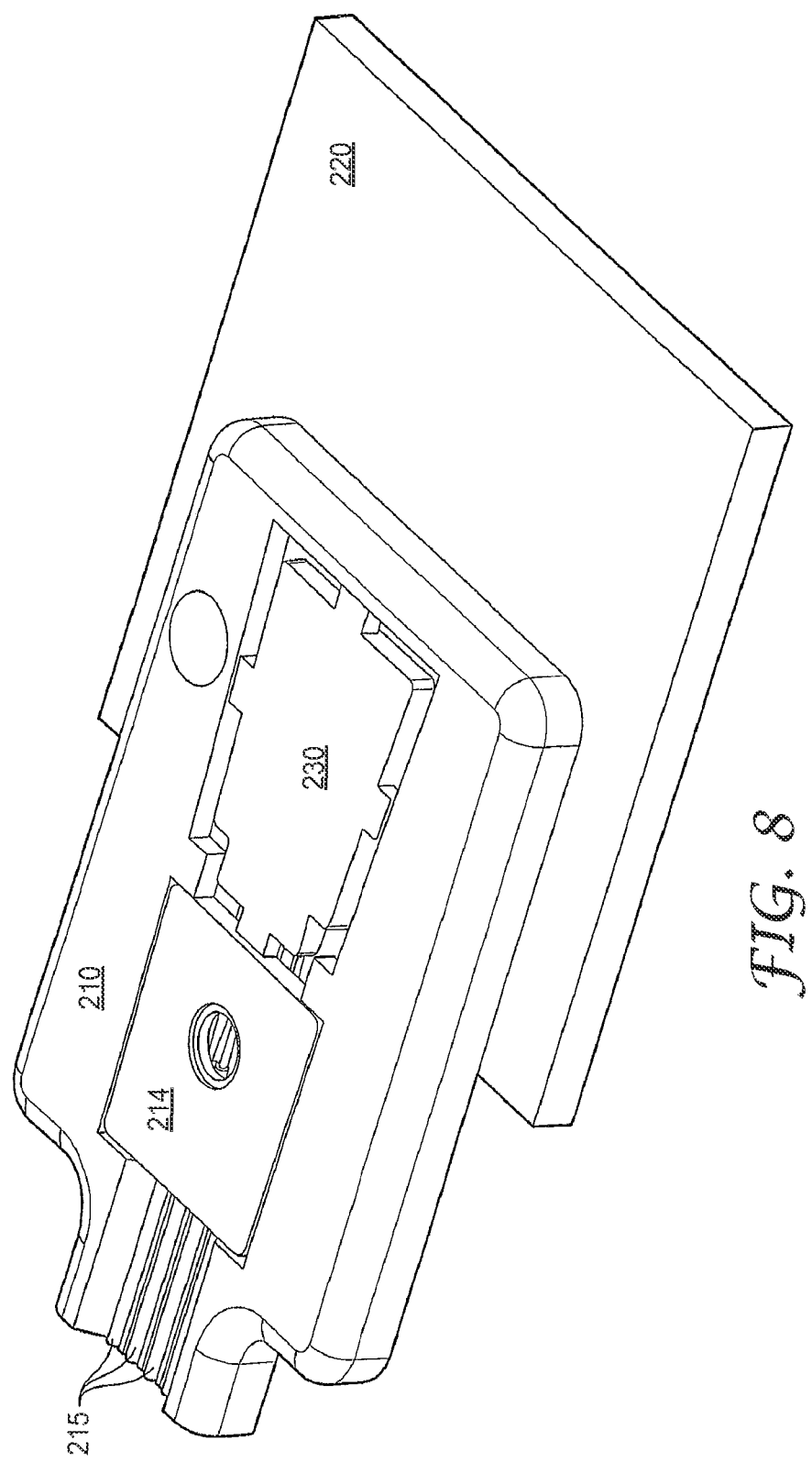
FIG. 8 depicts a perspective view of the assembled fiber optic device of FIG. 6.

FIG. 7A depicts support/housing 210 coupled to base 220. Support/housing 210 may include one or more locating holes 240 positioned on a bottom surface of the support/housing. Locating holes 240 may be mated with one or more alignment posts 242 affixed to base 220. Locating holes 240, in combination with alignment posts 242 are used to provide an approximate alignment of support/housing 210 with the optoelectronic devices. The diameter of an alignment post 242 may be less than a diameter of a corresponding locating hole 240. This allows the position of the support/housing 210 with respect to base 220 to be moved after the support/housing is coupled to the base. In one embodiment, active alignment may be performed after the support/housing is coupled to the base. During active alignment, one or more of the optoelectronic devices are activated and the position of the support/housing is altered until a maximum efficiency between the optoelectronic devices and the optical fibers is achieved. An adhesive may be used to secure support/housing 210 to base 220 after the components are optically aligned. A perspective view of the assembled fiber optic device is shown in FIG. 8.

Another embodiment of a fiber optic device is depicted in FIGS. 9A and 9B. This embodiment utilizes the same unitary support/housing design described above with respect to the embodiment depicted in FIGS. 6-8. In contrast to the previously described embodiments, the embodiment of FIG. 9 relies on an angled surface of the support/housing to create a TIR effect.

As shown in FIG. 9, a support/housing 310 includes an angled section 330. Angled section 330 acts as a reflector to direct light between an optoelectronic device 322 and an optical fiber 315. In one embodiment, angled section 330 relies on a TIR effect to redirect light. Angled section 330 is molded as a part of support/housing 310 at an angle that is greater than or equal to the critical angle formed between the optoelectronic device and the optical fiber. A space 345 behind angled surface 330 is a pocket, filled with a gas such as air, in order to allow the TIR effect to take place. In some embodiments an angle of the angled section is 45 degrees. This creates a TIR effect that is equivalent to the TIR effect created using a beveled optical fiber. Light impinging on angled section 330 is reflected by 90 degrees toward optical fiber 315 or optoelectronic device 322, when the components are properly aligned, depending on the direction of propagation of the light.

Optical fiber 315, in this embodiment, has a substantially straight end. For example, the angle of the end of optical fiber 315 may range from about 0 degrees to about 10 degrees. Angling the end of the optical fiber 315 at an angle of greater than about 5 degrees may help to minimize back reflection of the light. Optical fibers 315 may be placed in grooves, as previously described, and cut (e.g., with a laser) to form a substantially straight end. Optical fibers may, alternatively, be cleaved prior to mounting the optical fibers in the support. To avoid "shaving" of the support surface, as the optical fibers are positioned in the support, the ends of the optical fibers may be smoothed by polishing or with a laser.

Similar to previously described embodiment, one or more lenses may be disposed along the optical pathway between the optoelectronic device and the optical fiber to enhance the optical efficiency.

Figure 10A:
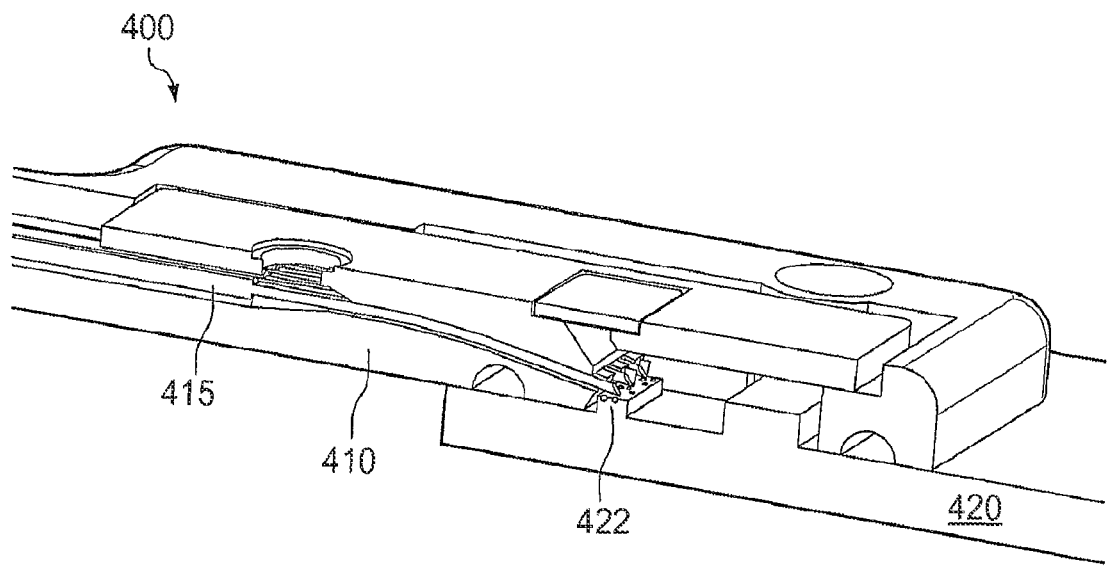
FIG. 10A depicts a perspective view of an assembled alternate fiber optic device.
Figure 10B:
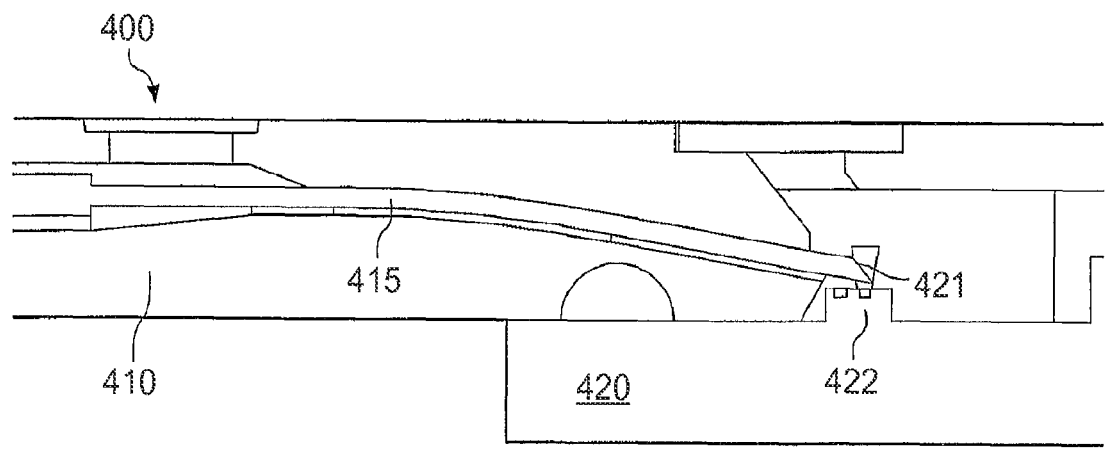
FIG. 10B depicts a cross-sectional view of the assembled fiber optic device of FIG. 10B.

In an alternate embodiment, the need for lenses may be eliminated by placing the optical fiber within 100 μm of the optoelectronic device. Referring to FIGS. 10A and 10B, a fiber optic device 400 includes a support/housing 410 and a base 420. Support/housing 410 includes one or more optical fibers 415 coupled to support/housing 410. This embodiment utilizes the same unitary molded support/housing design described above with respect to the embodiment depicted in FIGS. 6-8 and FIG. 9. In contrast to the previously described embodiments, the embodiment of FIGS. 10A and 10B relies on bringing optical fibers 415 into close proximity to optoelectronic devices 422. Support/housing 410 is configured such that optical fibers 415 are bent toward optoelectronic device 422. In an embodiment, the bent profile is such that there is no undue stress applied on the optical fibers. When support/housing 410 is coupled to base 420, the bent portion of the optical fibers 415 are optically coupled with the optoelectronic device 422. Base 420 is a structure that includes one or more optoelectronic devices 422 and circuitry configured to control operation of the one or more optoelectronic devices. In one embodiment, base 420 is a printed circuit board (e.g., a FR4 board).

In one embodiment, one or more optical fibers are in a bent configuration. As used herein the term "straight" or "unbent" refers to a characteristic of an optical fiber in which substantially all points of the surface of the optical fiber have a curvature of about zero. The term "bent" refers to a characteristic of an optical fiber in which portions of the surface of the optical fiber have a curvature that is not zero. As used herein the phrase "at least a portion of the optical fiber is substantially bent" refers to an optical fiber wherein a portion of the surface of the optical fiber is characterized by having a curvature that is not zero. It should be understood that an optical fiber where at least a portion of the surface is substantially non-planar may include portions that are straight (i.e., have a curvature of zero).

Light is coupled between optoelectronic devices 422 and optical fibers 415 by affixing the end of the optical fiber proximate to the optoelectronic device. Optical fiber 415 may be positioned such that the end of the optical fiber is within 100 μm, 75 μm, 50 μm, 30 μm, 20 μm, or 10 μm of the optoelectronic device. In one embodiment, end 421 of optical fiber 415 is beveled, as depicted in FIG. 10B. In one embodiment, light propagates from a light emitting optoelectronic device through the side of the optical fiber and is totally internally reflected by the beveled end into the core of the optical fiber. The maximum percentage of power which can be coupled using this geometry is very close to that which is achievable by butt-coupling into a cleaved fiber. In another embodiment, light propagating through the optical fiber may be totally internally reflected to an optoelectronic device by the beveled end of the optical fiber.

Positioning of the bevel in the proper orientation with respect to the optoelectronic device is important for achieving optical efficiency. Due to the small dimensions involved, positioning of a pre-beveled optical fiber in the precise location to maximize the optical efficiency can be difficult and time consuming. Additionally, in this embodiment, the non-standard coupling angle between the bent portion of the optical fiber and the optoelectronic device makes determining the critical angle more difficult (e.g., the critical angle may not always be about 45 degrees).

In one embodiment, beveled end 421 of an optical fiber 415 is created after the optical fiber is positioned over the optoelectronic device. Optical fiber 415 may be positioned in support/housing 410 such that an end of the optical fiber extends toward the optoelectronic device, as depicted in FIGS. 10A and 10B. Once support/housing 410 is secured in a position with optical fiber 415 aligned with optoelectronic device 422, ends of the optical fibers extending toward the optoelectronic device are cleaved at an angle greater than or equal to the critical angle formed between the optoelectronic device that is optically coupled to the optical fiber. Cleaving of the fiber may be accomplished by mechanical means or by laser cleaving.

Due to the unconventional angle that the optical fiber is oriented with respect to the optoelectronic device, an iterative process may be used to cleave the optical fiber at the appropriate angle and location. In an iterative process, support/housing 410, which includes one or more optical fibers 415, is coupled to base 420. Using one or more common alignment reference features, optical fibers are cleaved (e.g., using a laser) at a first angle greater than zero degrees. After cleaving optical fibers 415, one or more of the optoelectronic devices 422 are operated and the efficiency of the coupling between the optoelectronic device and the optical fiber is determined. If the efficiency is determined to meet a predefined set point, the process is considered to be complete. If the efficiency is less than a pre determined set point, the angle or lateral position of the cleaving device may be altered and the fiber cleaved at an angle and/or in a position that is different than the first set of cleaving conditions. This process may be repeated until the device is deemed to be acceptable, or it is determined that the device cannot be properly constructed (in which case the device may be discarded).

Coupling optical fibers to optoelectronic devices with the optical fibers in a bent configuration allows the optical fibers to be more easily aligned with the optoelectronic devices. In this embodiment, the need for lenses has been eliminated. This leads to a simpler design that is quickly manufactured and has less chance of being misaligned. Another advantage of this feature is that the device allows for a range of optical fiber positions so that small changes in the optical parameters can be accommodated.

Each embodiment offers improved alignment capability over other conventional designs. In one embodiment, the optical fiber device is an interlocking device, as depicted in FIGS. 2-5. This device includes a plurality of points where, if the device is not properly aligned, the optical efficiency may be low. In another embodiment, the support/housing is formed as a single unit. Because coupling between the house and support is not necessary in this embodiment, some of the issues that create tolerance problems when the support is coupled to the housing are eliminated. In another embodiment, the optical fibers are in a bent configuration that brings the ends to a position that is close enough to allow optical coupling of the fiber to the optoelectronic device. This last configuration eliminates many of the alignment steps required for other embodiments.

Fiber optic devices described herein may be used as single-mode devices (e.g., an optical receiver or optical transmitter) or as multi-mode devices (e.g., an optical transceiver). The specific application of the fiber optic device is generally determined by the components attached to the base.

It should be understood, that the above-described improvements may be used in combination with any of the features of the previously described embodiments.

Further embodiments are herein described in the following clauses:

CLAUSE A: A Method of Forming a Fiber Optic Device Comprising:
  securing one or more optical fibers to a support, wherein the support comprises one or more support alignment reference features for aligning the support with a base comprising one or more optoelectronic devices;
  cleaving one or more optical fibers;
  coupling the support to a base housing such that the one or more support alignment reference features are aligned with one or more base housing alignment reference features;
  wherein at least one optical fiber is cleaved at an angle greater than or equal to the critical angle formed between an optoelectronic device that is optically coupled to the optical fiber when the support is coupled to the base.

Clause A1: The method of clause A, wherein the a support alignment feature comprises a sidewall of the support and wherein a base housing alignment feature comprises a sidewall of a cavity of the base housing configured to receive the support, wherein coupling the support to the base comprises positioning the support within the cavity.

Clause A2: The method of clause A, wherein a support alignment feature comprises a post and wherein a base alignment feature comprises a locating hole, wherein coupling the support to the base comprises positioning the support on the base such that the post is positioned in the locating hole.

Clause A3: The method of clause A2, wherein the diameter of the post is less than a diameter of the locating hole, wherein coupling the support to the base further comprises laterally altering a position of the support with respect to the base after the post is positioned in the locating hole.

Clause A4: The method of clause A3, further comprising laterally altering the position of the support with respect to the base with one or more of the optoelectronic devices in an active state.

Clause A5: The method of clause A, wherein the support comprises one or more grooves and wherein securing one or more optical fibers to a support comprises connecting one or more of the optical fibers to the grooves with an adhesive.

Clause A6: The method of clause A5, wherein one or more grooves are V-shaped.

Clause A7: The method of clause A, wherein the base housing comprises one or more lenses molded as a portion of the base housing.

Clause A8: The method of clause A7, wherein the support comprises at least two lenses molded as a portion of the base housing, wherein first and second lens are in optical alignment with each other.

Clause A9: The method of clause A, wherein at least a portion of the support is composed of an optical grade transparent polymer.

Clause A10: The method of clause A, wherein the one or more optical fibers are coated optical fibers.

Clause A11: The method of clause A, wherein one or more of the optical fibers are cleaved with a laser.

Clause A12: The method of clause A, wherein each of the one or more of the optical fibers are cleaved.

Clause A13: The method of clause A, wherein one or more of the optical fibers are coated optical fibers, the method further comprising removing a coating from a portion of one or more of the optical fibers using a laser and cleaving one or more of the uncoated portions with a laser.

Clause A14: The method of clause A, wherein one or more of the optical fibers are coated optical fibers, the method further comprising removing a coating from a portion of one or more of the optical fibers using a mechanical stripping process and cleaving one or more of the uncoated portions with a laser.

Clause A15: The method of clause A, wherein one or more of the optical fibers are coated optical fibers, the method further comprising removing a coating from a portion of one or more of the optical fibers using an chemical stripping process and cleaving one or more of the uncoated portions with a laser.

Clause A16: The method of clause A, wherein the base is a printed circuit board and one or more of the optoelectronic devices are light emitting diodes coupled to the printed circuit board.

Clause A17: The method of clause A, wherein the base is a printed circuit board and one or more of the optoelectronic devices are laser diodes coupled to the printed circuit board.

Clause A18: The method of clause A, wherein the base is a printed circuit board and one or more of the optoelectronic devices are photodetectors coupled to the printed circuit board.

Clause A19: The method of clause A, further comprising securing the support to the base using an adhesive.

Clause A20: The method of clause A19, wherein the adhesive is an epoxy adhesive.

Claim A21: The method of clause A, wherein the optical device is an optical transceiver.

Clause B: A Fiber Optic Device Comprising:
  a support comprising:
    one or more optical fibers coupled to the support; and
    one or more lenses molded as a portion of the support;
      wherein one or more of the optical fibers are positioned in optical alignment with one or more of the lenses; and
  a base comprising one or more optoelectronic devices;
  wherein the support is coupled to the base such that one or more of the optoelectronic devices are optically coupled to one or more of the optical fibers through one or more of the lenses molded as a portion of the support.

Clause B1: The device of clause B, wherein an end of one or more of the optical fibers is cleaved at an angle greater than or equal to the critical angle formed between an optoelectronic device that is optically coupled to the optical fiber when the support is coupled to the base.

Clause B2: The device of clause B, wherein one or more ends of one or more of the optical fibers are at an angle greater than or equal to 45 degrees.

Clause B3: The device of clause B, wherein the support comprises one or more support alignment reference features for aligning the support with one or more base alignment reference features.

Clause B4: The device of clause B2, wherein a support alignment feature is a sidewall of the support and wherein a base alignment feature is a sidewall of a cavity configured to receive the support, wherein the support is positioned within the cavity.

Clause B5: The device of clause B2, wherein a support alignment feature is a post and wherein a base alignment feature is a locating hole, wherein the support the post is positioned in the locating hole.

Clause B6: The device of clause B5, wherein the diameter of the post is less than a diameter of the locating hole such that the position of the support is laterally alterable with respect to the base after the post is positioned in the locating hole.

Clause B7: The device of clause B, wherein the support comprises one or more grooves and wherein one or more optical fibers are connected to the grooves with an adhesive.

Clause B8: The device of clause B7, wherein one or more grooves are V-shaped.

Clause B9: The device of clause B, wherein the support comprises at least two lenses molded as a portion of the support.

Clause B10: The device of clause B, wherein at least a portion of the support is composed of an optical grade transparent polymer.

Clause B11: The device of clause B, wherein the one or more optical fibers are coated optical fibers.

Clause B12: The device of clause B, wherein the base is a printed circuit board and one or more of the optoelectronic devices are light emitting diodes coupled to the printed circuit board.

Clause B13: The device of clause B, wherein the base is a printed circuit board and one or more of the optoelectronic devices are laser diodes coupled to the printed circuit board.

Clause B14: The device of clause B, wherein the base is a printed circuit board and one or more of the optoelectronic devices are photodetectors coupled to the printed circuit board.

Clause B15: The device of clause B, wherein the optical device is an optical transceiver.

Clause C: A Fiber Optic Device Comprising:
  a support comprising one or more optical fibers coupled to the support, wherein at least a portion of the optical fiber in contact with the support is substantially bent; and
  a base comprising one or more optoelectronic devices;
  wherein the support is coupled to the base such that one or more of the optoelectronic devices are optically coupled to the bent portion of one or more of the optical fibers.

Clause C1: The device of clause C, wherein an end of one or more of the optical fibers is cleaved at an angle greater than or equal to the critical angle formed between an optoelectronic device that is optically coupled to the optical fiber when the support is coupled to the base.

Clause C2: The device of clause C, wherein one or more ends of one or more of the optical fibers are at an angle greater than or equal to 45 degrees.

Clause C3: The device of clause C, wherein one or more ends of one or more of the optical fibers are positioned within 100 μm of one or more of the optoelectronic devices.

Clause C4: The device of clause C, wherein the support comprises one or more support alignment reference features for aligning the support with one or more base alignment reference features.

Clause C5: The device of clause C4, wherein a support alignment feature is a sidewall of the support and wherein a base alignment feature is a sidewall of a cavity configured to receive the support, wherein the support is positioned within the cavity.

Clause C6: The device of clause C4, wherein a support alignment feature is a post and wherein a base alignment feature is a locating hole, wherein the support the post is positioned in the locating hole.

Clause C7: The device of clause C, wherein the diameter of the post is less than a diameter of the locating hole such that the position of the support is laterally alterable with respect to the base after the post is positioned in the locating hole.

Clause C8: The device of clause C, wherein the support comprises one or more grooves and wherein one or more optical fibers are connected to the grooves with an adhesive.

Clause C9: The device of clause C8, wherein one or more grooves are V-shaped.

Clause C10: The device of clause C, wherein at least a portion of the support is composed of an optical grade transparent polymer.

Clause C11: The device of clause C, wherein the one or more optical fibers are coated optical fibers.

Clause C12: The device of clause C, wherein the base is a printed circuit board and one or more of the optoelectronic devices are light emitting diodes coupled to the printed circuit board.

Clause C13: The device of clause C, wherein the base is a printed circuit board and one or more of the optoelectronic devices are laser diodes coupled to the printed circuit board.

Clause C14: The device of clause C, wherein the base is a printed circuit board and one or more of the optoelectronic devices are photodetectors coupled to the printed circuit board.

Clause C15: The device of clause C, wherein the optical device is an optical transceiver.

Clause D: A Fiber Optic Device Comprising:
- a support comprising:
    - one or more optical fibers coupled to the support, wherein an end of one or more of the optical fibers is at an angle of greater than 45;
    - a base comprising one or more optoelectronic devices;
- wherein the support is coupled to the base such that one or more of the optoelectronic devices are optically coupled to one or more of the optical fibers.

Clause D1: The device of clause D, wherein an end of each optical fiber is cleaved at an angle greater than or equal to the critical angle formed between an optoelectronic device that is optically coupled to the optical fiber when the support is coupled to the base.

Clause D2: The device of clause D, wherein one or more ends of one or more of the optical fibers are positioned within 100 μm of one or more of the optoelectronic devices.

Clause D3: The device of clause D, wherein the support comprises one or more support alignment reference features for aligning the support with one or more base alignment reference features.

Clause D4: The device of clause D3, wherein a support alignment feature is a sidewall of the support and wherein a base alignment feature is a sidewall of a cavity configured to receive the support, wherein the support is positioned within the cavity.

Clause D5: The device of clause D3, wherein a support alignment feature is a post and wherein a base alignment feature is a locating hole, wherein the support the post is positioned in the locating hole.

Clause D6: The device of clause D3, wherein the diameter of the post is less than a diameter of the locating hole such that the position of the support is laterally alterable with respect to the base after the post is positioned in the locating hole.

Clause D7: The device of clause D, wherein the support comprises one or more grooves and wherein one or more optical fibers are connected to the grooves with an adhesive.

Clause D8: The device of clause D7, wherein one or more grooves are V-shaped.

Clause D9: The device of clause D, wherein at least a portion of the support is composed of an optical grade transparent polymer.

Clause D10: The device of clause D, wherein the one or more optical fibers are coated optical fibers.

Clause D11: The device of clause D, wherein the base is a printed circuit board and one or more of the optoelectronic devices are light emitting diodes coupled to the printed circuit board.

Clause D12: The device of clause D, wherein the base is a printed circuit board and one or more of the optoelectronic devices are laser diodes coupled to the printed circuit board.

Clause D13: The device of clause D, wherein the base is a printed circuit board and one or more of the optoelectronic devices are photodetectors coupled to the printed circuit board.

Clause D14: The device of clause D, wherein the optical device is an optical transceiver.

Clause E: A Fiber Optic Device Comprising:
- a support comprising:
    - one or more optical fibers coupled to the support; and
    - one or more reflecting surfaces positioned proximate to an end of one or more of the optical fibers, wherein the reflecting surfaces are molded as a portion of the support; and
    - a base comprising one or more optoelectronic devices;
- wherein the support is coupled to the base such that one or more of the optoelectronic devices are optically coupled to one or more of the optical fibers through the one or more reflecting surfaces.

Clause E1: The device of clause E, wherein the reflective surface is an angled surface having an angle of 45 degrees with respect to the optoelectronic device that is optically coupled to the optical fiber through the reflecting surface when the support is coupled to the base.

Clause E2: The device of clause E, wherein the reflecting surface is at an angle greater than or equal to 45 degrees.

Clause E3: The device of clause E, wherein the reflecting surface comprises a reflective material coupled to the support material.

Clause E4: The device of clause E, wherein the support comprises one or more support alignment reference features for aligning the support with one or more base alignment reference features.

Clause E5: The device of clause E4, wherein a support alignment feature is a sidewall of the support and wherein a base alignment feature is a sidewall of a cavity configured to receive the support, wherein the support is positioned within the cavity.

Clause E6: The device of clause E4, wherein a support alignment feature is a post and wherein a base alignment feature is a locating hole, wherein the support the post is positioned in the locating hole.

Clause E7: The device of clause E6, wherein the diameter of the post is less than a diameter of the locating hole such that the position of the support is laterally alterable with respect to the base after the post is positioned in the locating hole.

Clause E8: The device of clause E, wherein the support comprises one or more grooves and wherein one or more optical fibers are connected to the grooves with an adhesive.

Clause E9: The device of clause E8, wherein one or more grooves are V-shaped.

Clause E10: The device of clause E, wherein the support further comprises:
- one or more grooves, wherein one or more of the optical fibers are positioned in the grooves; and
- one or more lenses, integral with the body, positioned such that one or more of the lenses are in optical alignment one or more of the optical fibers when an optical fiber is positioned proximate to the lens in one or more of the grooves.

Clause E11: The device of clause E, wherein the support further comprises one or more lenses molded as a portion of the support; wherein one or more of the optical fibers are positioned in optical alignment with one or more of the lenses.

Clause E12: The device of clause E, wherein the support comprises at least two lenses molded as a portion of the support.

Clause E13: The device of clause E, wherein at least a portion of the support is composed of an optical grade transparent polymer.

Clause E14: The device of clause E, wherein the one or more optical fibers are coated optical fibers.

Clause E15: The device of clause E, wherein the base is a printed circuit board and one or more of the optoelectronic devices are light emitting diodes coupled to the printed circuit board.

Clause E16: The device of clause E, wherein the base is a printed circuit board and one or more of the optoelectronic devices are laser diodes coupled to the printed circuit board.

Clause E17: The device of clause E, wherein the base is a printed circuit board and one or more of the optoelectronic devices are photodetectors coupled to the printed circuit board.

Clause E18: The device of clause E, wherein the optical device is an optical transceiver.

Clause F: A Method of Making a Fiber Optic Device Comprising:
- positioning one or more optical fibers on a support;
- positioning the support on a base, the base comprising one or more optoelectronic devices, such that one or more of the optical fibers are optically aligned with one or more optoelectronic devices coupled to the base;
- cutting at least one optical fiber at a first position while the support is positioned on the base;
- activating one or more of the optoelectronic devices;
- determining the efficiency of an optical connection between one or more of the optical fibers and one or more of the optoelectronic devices optically aligned with the one or more optical fibers;
- cutting the optical fibers at a second position, if the efficiency of the optical connection is less than a predetermined set point.

Clause F1: The method of clause F, wherein cutting the optical fibers at a second position alters the length of the optical fibers.

Clause F2: The method of clause F, wherein cutting the optical fibers in the first position comprises cutting the fibers at a first angle, wherein the first angle is greater than zero degrees; and wherein cutting the optical fibers in the second position comprises cutting the optical fibers at a second angle, wherein the second angle is greater than the first angle.

Clause F3: The method of clause F, wherein the support comprises one or more support alignment reference features for aligning the support with a base comprising one or more base alignment reference features.

Clause F4: The method of clause F3, wherein the a support alignment feature is a sidewall of the support and wherein a base alignment feature is a sidewall of a cavity configured to receive the support, wherein positioning the support to the base comprises positioning the support within the cavity.

Clause F5: The method of clause F3, wherein a support alignment feature is a post and wherein a base alignment feature is a locating hole, wherein positioning the support to the base comprises positioning the support on the base such that the post is positioned in the locating hole.

Clause F6: The method of clause F5, wherein the diameter of the post is less than a diameter of the locating hole, wherein positioning the support to the base further comprises laterally altering a position of the support with respect to the base after the post is positioned in the locating hole.

Clause F7: The method of clause F6, further comprising laterally altering the position of the support with respect to the base with one or more of the optoelectronic devices in an active state.

Clause F8: The method of clause F, wherein the support comprises one or more grooves and wherein positioning one or more optical fibers to a support comprises connecting one or more of the optical fibers to the grooves with an adhesive.

Clause F9: The method of clause F8, wherein one or more grooves are V-shaped.

Clause F10: The method of clause F, wherein the support comprises one or more lenses molded as a portion of the support.

Clause F11: The method of clause F, wherein the support comprises at least two lenses molded as a portion of the support.

Clause F12: The method of clause F, wherein at least a portion of the support is composed of an optical grade transparent polymer.

Clause F13: The method of clause F, wherein the one or more optical fibers are coated optical fibers.

Clause F14: The method of clause F, wherein one or more of the optical fibers are cut with a laser.

Clause F15: The method of clause F, wherein each of the one or more of the optical fibers are cleaved.

Clause F16: The method of clause F, wherein one or more of the optical fibers are coated optical fibers, the method further comprising removing a coating from a portion of one or more of the optical fibers using a laser and cutting one or more of the uncoated portions with a laser.

Clause F17: The method of clause F, wherein one or more of the optical fibers are coated optical fibers, the method further comprising removing a coating from a portion of one or more of the optical fibers using a mechanical stripping process and cleaving one or more of the uncoated portions with a laser.

Clause F18: The method of clause F, wherein one or more of the optical fibers are coated optical fibers, the method further comprising removing a coating from a portion of one or more of the optical fibers using an chemical stripping process and cleaving one or more of the uncoated portions with a laser.

Clause F19: The method of clause F, wherein the base is a printed circuit board and one or more of the optoelectronic devices are light emitting diodes coupled to the printed circuit board.

Clause F20: The method of clause F, wherein the base is a printed circuit board and one or more of the optoelectronic devices are laser diodes coupled to the printed circuit board.

Clause F21: The method of clause F, wherein the base is a printed circuit board and one or more of the optoelectronic devices are photodetectors coupled to the printed circuit board.

Clause F22: The method of clause F, further comprising securing the support to the base using an adhesive.

Clause F23: The method of clause F22, wherein the adhesive is an epoxy adhesive.

Clause F24: The method of clause F, wherein the optical device is an optical transceiver.

Clause G: A Method of Forming a Fiber Optic Device Comprising:
- securing one or more optical fibers to a support, wherein at least a portion of the one or more optical fibers in contact with the fiber optic support is substantially bent;
- coupling the support to a base comprising one or more optoelectronic devices such that one or more ends of the one or more optical fibers are positioned, at an angle substantially greater than zero, within 100 µm of one or more of the optoelectronic devices;
- cleaving one or more of the ends of the one or more optical fibers positioned proximate to the one or more optoelectronic devices at an angle greater than or equal to the critical angle formed between the optoelectronic device and the end of the optical fiber positioned proximate to the optoelectronic device.

Clause G1: The method of clause G, wherein the support comprises one or more support alignment reference features for aligning the support with a base comprising one or more base alignment reference features.

Clause G2: The method of clause G1, wherein the a support alignment feature is a sidewall of the support and wherein a base alignment feature is a sidewall of a cavity configured to receive the support, wherein positioning the support to the base comprises positioning the support within the cavity.

Clause G3: The method of clause G1, wherein a support alignment feature is a post and wherein a base alignment feature is a locating hole, wherein positioning the support to the base comprises positioning the support on the base such that the post is positioned in the locating hole.

Clause G4: The method of clause G3, wherein the diameter of the post is less than a diameter of the locating hole, wherein positioning the support to the base further comprises laterally altering a position of the support with respect to the base after the post is positioned in the locating hole.

Clause G5: The method of clause G4, further comprising laterally altering the position of the support with respect to the base with one or more of the optoelectronic devices in an active state.

Clause G6: The method of clause G, wherein the support comprises one or more grooves and wherein positioning one or more optical fibers to a support comprises connecting one or more of the optical fibers to the grooves with an adhesive.

Clause G7: The method of clause G6, wherein one or more grooves are V-shaped.

Clause G8: The method of clause G, wherein the one or more optical fibers are coated optical fibers.

Clause G9: The method of clause G, wherein one or more of the optical fibers are cut with a laser.

Clause G10: The method of clause G, wherein each of the one or more of the optical fibers are cleaved.

Clause G11: The method of clause G, wherein one or more of the optical fibers are coated optical fibers, the method further comprising removing a coating from a portion of one or more of the optical fibers using a laser and cutting one or more of the uncoated portions with a laser.

Clause G12: The method of clause G, wherein one or more of the optical fibers are coated optical fibers, the method further comprising removing a coating from a portion of one or more of the optical fibers using a mechanical stripping process and cleaving one or more of the uncoated portions with a laser.

Clause G13: The method of clause G, wherein one or more of the optical fibers are coated optical fibers, the method further comprising removing a coating from a portion of one or more of the optical fibers using an chemical stripping process and cleaving one or more of the uncoated portions with a laser.

Clause G14: The method of clause G, wherein the base is a printed circuit board and one or more of the optoelectronic devices are light emitting diodes coupled to the printed circuit board.

Clause G15: The method of clause G, wherein the base is a printed circuit board and one or more of the optoelectronic devices are laser diodes coupled to the printed circuit board.

Clause G16: The method of clause G, wherein the base is a printed circuit board and one or more of the optoelectronic devices are photodetectors coupled to the printed circuit board.

Clause G17: The method of clause G, further comprising securing the support to the base using an adhesive.

Clause G18: The method of clause G17, wherein the adhesive is an epoxy adhesive.

Clause G19: The method of clause G, wherein the optical device is an optical transceiver.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A fiber optic device comprising:
   a support comprising:
      one or more optical fibers coupled to the support, wherein at least a portion of the one or more optical fibers in contact with the support is substantially bent; and
      one or more lenses molded as a portion of the support; wherein one or more of the optical fibers are positioned in optical alignment with one or more of the lenses; and
   a base comprising one or more optoelectronic devices;
   wherein the support is coupled to the base such that one or more of the optoelectronic devices are optically coupled to one or more of the optical fibers through one or more of the lenses molded as a portion of the support.

2. The fiber optic device of claim 1, wherein an end of one or more of the optical fibers is cleaved at an angle greater than or equal to a critical angle formed between the optical fiber and an optoelectronic device that is optically coupled to the optical fiber when the support is coupled to the base.

3. The fiber optic device of claim 1, wherein one or more ends of one or more of the optical fibers are at an angle greater than or equal to 45 degrees.

4. The fiber optic device of claim 1, wherein the support comprises one or more support alignment reference features for aligning the support with one or more base alignment reference features.

5. The fiber optic device of claim 4, wherein a support alignment feature is a sidewall of the support and wherein a base alignment feature is a sidewall of a cavity configured to receive the support, wherein the support is positioned within the cavity.

6. The fiber optic device of claim 4, wherein a support alignment feature is a post and wherein a base alignment feature is a locating hole, wherein the support the post is positioned in the locating hole.

7. The fiber optic device of claim 6, wherein a diameter of the post is less than a diameter of the locating hole such that the position of the support is laterally alterable with respect to the base after the post is positioned in the locating hole.

8. The fiber optic device of claim 1, wherein the support comprises at least two lenses molded as a portion of the support.

9. A fiber optic device comprising:
a support comprising one or more optical fibers coupled to the support, wherein at least a portion of the one or more optical fibers in contact with the support is substantially bent; and
a base comprising one or more optoelectronic devices;
wherein the support is coupled to the base such that one or more of the optoelectronic devices are optically coupled to the bent portion of one or more of the optical fibers; and
wherein an end of one or more of the optical fibers is cleaved at an angle greater than or equal to a critical angle formed between the optical fiber and an optoelectronic device that is optically coupled to the optical fiber when the support is coupled to the base.

10. The fiber optic device of claim 9, wherein one or more ends of one or more of the optical fibers are at an angle greater than or equal to 45 degrees.

11. The fiber optic device of claim 9, wherein one or more ends of one or more of the optical fibers are positioned within 100 μm of one or more of the optoelectronic devices.

12. The fiber optic device of claim 9, wherein the support comprises one or more support alignment reference features for aligning the support with one or more base alignment reference features.

13. The fiber optic device of claim 9, wherein the support comprises one or more grooves and wherein one or more optical fibers are connected to the grooves with an adhesive.

14. The fiber optic device of claim 9, wherein at least a portion of the support is composed of an optical grade transparent polymer.

15. The fiber optic device of claim 9, wherein the base is a printed circuit board and one or more of the optoelectronic devices are light emitting diodes, laser diodes, or photodetectors coupled to the printed circuit board.

16. A method of forming a fiber optic device comprising:
securing one or more optical fibers to a support, wherein at least a portion of the one or more optical fibers in contact with the support is substantially bent;
coupling the support to a base comprising one or more optoelectronic devices such that one or more ends of the one or more optical fibers are positioned, at an angle substantially greater than zero, within 100 μm of one or more of the optoelectronic devices;
cleaving one or more of the ends of the one or more optical fibers positioned proximate to the one or more optoelectronic devices at an angle greater than or equal to a critical angle formed between the optoelectronic device and the end of the optical fiber positioned proximate to the optoelectronic device.

17. The method of claim 16, wherein the support comprises one or more support alignment reference features for aligning the support with a base comprising one or more base alignment reference features.

18. The method of claim 17, wherein a support alignment feature is a sidewall of the support and wherein a base alignment feature is a sidewall of a cavity configured to receive the support, wherein positioning the support to the base comprises positioning the support within the cavity.

19. The method of claim 17, wherein a support alignment feature is a post and wherein a base alignment feature is a locating hole, wherein positioning the support to the base comprises positioning the support on the base such that the post is positioned in the locating hole.

20. The method of claim 16, further comprising laterally altering the position of the support with respect to the base with one or more of the optoelectronic devices in an active state.

* * * * *